Sept. 16, 1941.  H. W. SIMPSON  2,256,413
MOWER STRUCTURE
Original Filed Jan. 22, 1940   4 Sheets-Sheet 1

INVENTOR.
HOWARD W. SIMPSON
BY
*Whittemore, Hulbert & Belknap*
ATTORNEYS

Sept. 16, 1941.  H. W. SIMPSON  2,256,413
MOWER STRUCTURE
Original Filed Jan. 22, 1940  4 Sheets-Sheet 2

INVENTOR.
HOWARD W. SIMPSON
BY
ATTORNEYS

Sept. 16, 1941.  H. W. SIMPSON  2,256,413
MOWER STRUCTURE
Original Filed Jan. 22, 1940  4 Sheets-Sheet 3

INVENTOR.
HOWARD W. SIMPSON
BY
ATTORNEYS

Sept. 16, 1941.                H. W. SIMPSON                 2,256,413
                              MOWER STRUCTURE
                    Original Filed Jan. 22, 1940    4 Sheets—Sheet 4

INVENTOR.
HOWARD W. SIMPSON
BY
       Whittemore, Hulbert & Belknap
                              ATTORNEYS Patented Sept. 16, 1941

2,256,413

UNITED STATES PATENT OFFICE 2,256,413

MOWER STRUCTURE

Howard W. Simpson, Dearborn, Mich., assignor to Detroit Harvester Company, Detroit, Mich., a corporation of Michigan Original application January 22, 1940, Serial No. 315,112, now Patent No. 2,245,448, dated June 10, 1941. Divided and this application May 20, 1940, Serial No. 336,284

3 Claims. (Cl. 56—25)

This invention relates generally to mower structures such as tractor operated mowers, and constitutes a division of my application filed January 22, 1940, bearing Serial No. 315,112, now Patent No. 2,245,448, granted June 10, 1941.

One of the objects of the invention is to provide an improved manually operable means for lifting the mower bar support and associated parts relative to the ground.

Another object is to provide a counterbalancing means in connection with the lifting means for exerting continuously through a portion of the lifting means a lifting force on the mower bar support.

Another object is to provide a lifting means of the type mentioned wherein the counterbalanced portion of the lifting means is operable independently of the manually operable lever for effecting the lift and constructed in such a way that upward movement of the mower bar support independently of the manually operable lever is permitted, for example, when the mower bar rides up over a high point on the ground.

Another object is to provide a lifting means that is capable of limiting the downward position of the mower bar support while permitting the independent upward movement aforesaid.

Other objects, advantages and novel details of construction of this invention will be made more apparent as this description proceeds, especially when considered in connection with the accompanying drawings, wherein:

Figure 5 is a longitudinal section of the torque transmitting shaft and the housing therefor;

Figure 6 is a section on the line 6—6 of Figure 1;

Figure 7 is a section on the line 7—7 of Figure 1;

Figure 1:
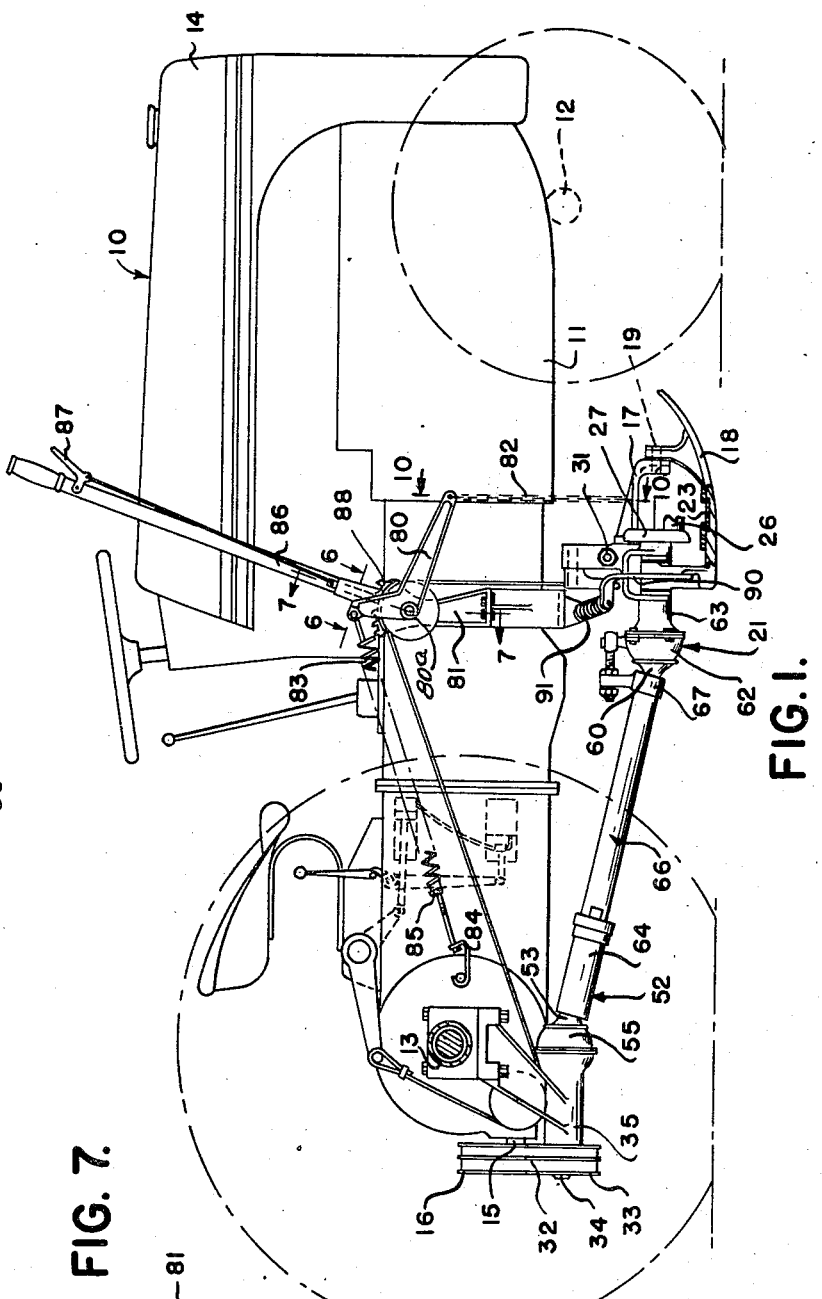
Figure 1 is a side elevation of my combined tractor-mower with parts broken away for clearness.

Referring now to the drawings, 10 is a tractor having a main frame 11 provided with a front axle 12 and a rear axle housing 13. A suitable motor (not shown) is provided within a hood 14 on the frame and is adapted to drive the tractor forwardly and rearwardly through suitable transmission means including a conventional clutch. The motor is also adapted to drive a suitable power take-off, including a shaft 15 and sheave 16.

Figure 2:
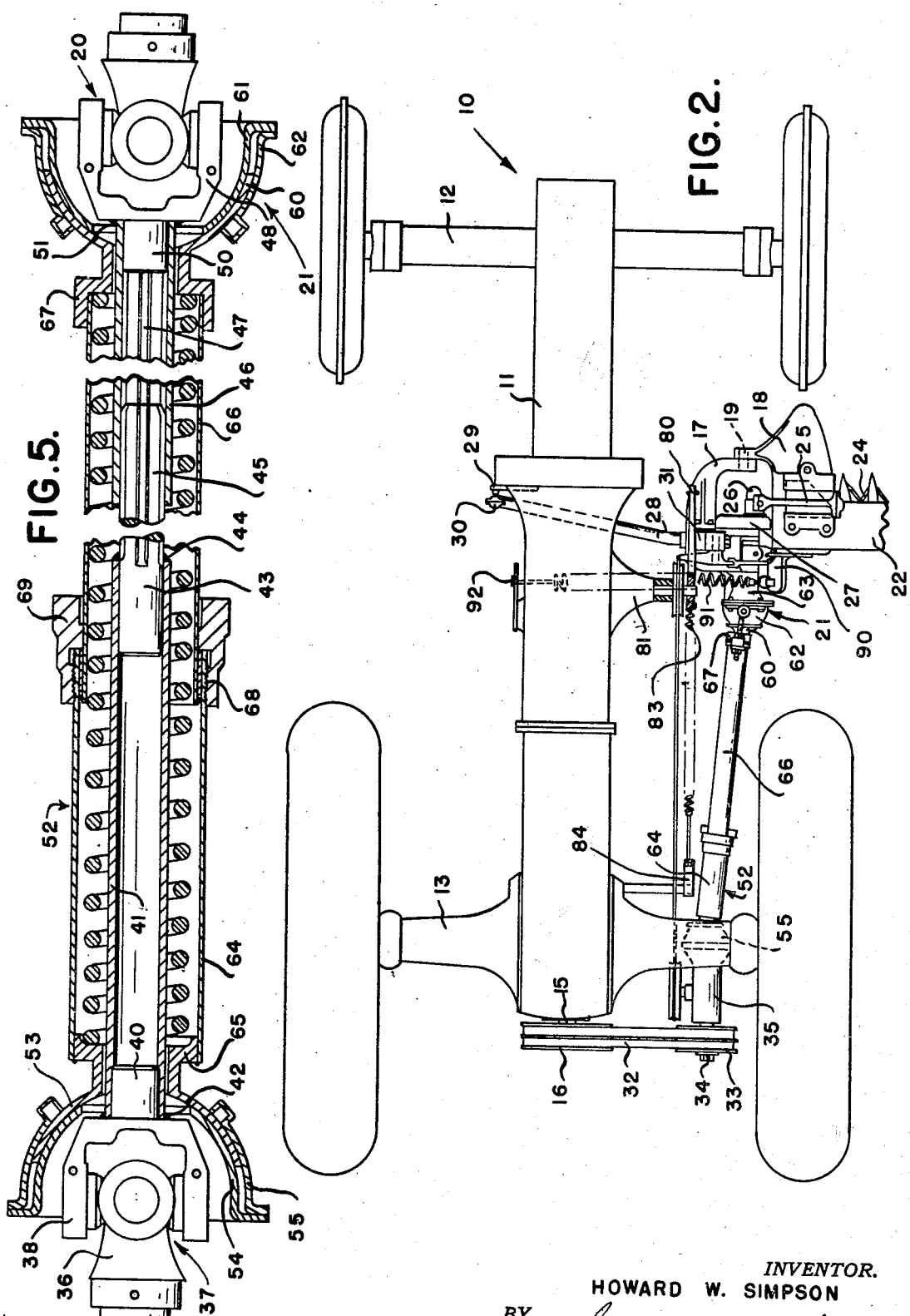
Figure 2 is a top plan view of my improved tractor-mower combination with parts broken away for clearness.

The mower mechanism comprises a support 17 to which is secured an inner shoe 18. The shoe 18 is pivoted to the support for vertical swinging movement about an axis defined by the pivot connection indicated at 19 in Figure 2 and the center of a universal joint 20 within a universally adjustable housing 21.

Rigidly secured to the shoe 18 is a mower arm 22 on which is mounted for longitudinal reciprocation a sickle bar 23 carrying cutting sectors 24. The sickle bar 23 is connected by a pitman 25 with a crank pin 26 carried by a crank 27 driven from the power take-off in a manner which will subsequently be described.

The support 17 is connected to the frame 11 of the tractor by a bar 28 which is secured to the frame of the tractor by a bracket 29 and a universal connection 30. Accordingly, the bar 28 permits movement of the support 17 about the center of the universal joint 30. The connection between the bar 28 and the support 17, as indicated at 31 in Figure 3, permits adjustment of the support 17 about a transverse horizontal axis, as will subsequently be described.

The power take-off shaft 15, previously referred to, is connected by a plurality of V-belts or other suitable drive means 32 to a plurality of sheaves 33 mounted on a shaft 34. The shaft 34 is mounted in a housing 35 rigidly secured as by bolting or otherwise to the rear axle housing 13 of the tractor. The shaft 34 carries at one end thereof one element 36 of a torque transmitting universal joint 37, the other element 38 being connected to the torque transmitting shaft which transmits the power to the crank 27. As best seen in Figure 5, the element 38 of the universal joint has a stub section 40 which is received within a torque transmitting tubular member 41 rigidly secured thereto as by welding or the like, as indicated at 42. The tubular member 41, at its opposite end, carries a shaft 43 rigidly secured thereto as indicated by the welded connection 44. Shaft 43 is splined as indicated at 45, and is received within a second tubular shaft 46 correspondingly splined, as indicated at 47, which is permanently secured to one element 48 of the universal joint 20 previously referred to. The connection between the tubular shaft 46 and the element 48 of the universal joint is indicated as comprising a short section 50 received within tubular shaft 46 and as including a welded connection 51. It will be evident that a torque will be transmitted from the single element 38 to the universal joint element 48 through the medium of the tubular member 41, shaft 43, and tubular shaft 46. At the same time the parts are telescopically arranged, the tubular shaft 46 being adapted to slide longitudinally over the splined shaft 45.

In order to protect the torque transmitting telescopic shafts just described, the tubular housing indicated generally at 52 is provided. This comprises a spherically formed cap 53 cooperating in universally adjusted relation with a spherically formed inner shell 54 and a spherically formed outer shell 55. Shells 54 and 55, as indicated in Figure 1, are secured to the shaft housing 35, and cooperate therewith to form a complete housing for the universal joint 37. At the opposite end of the torque transmitting assembly is a spherically formed shell 60 cooperating in universally adjusted relation with a spherically formed inner shell 61 and an outer shell 62. Shells 61 and 62, as best indicated in Figure 1, are rigidly secured to a crank shaft housing 63 with which they form the housing 21 for the universal joint 20. Housing 63 is in turn rigid with the support 17.

Intermediate the spherically formed shells 53 and 60, I provide a tubular member 64 welded or otherwise secured to a flange 65 on shell 53, and a cooperating tubular member 66 welded or otherwise secured within a flange 67 formed on the shell 60.

80 is a bell crank pivoted on a stub shaft 80ª projecting from a bracket 81 carried by the frame of the tractor. Preferably the bell crank 80 is connected to the support 17 by means of a chain 82, and is urged in a counterclockwise direction by a spring 83 connected to a bracket 84 secured to the frame 11 of the tractor adjacent the rear axle housing 13. Suitable means indicated at 85 are provided for adjusting the tension of the spring 83.

Figure 4:
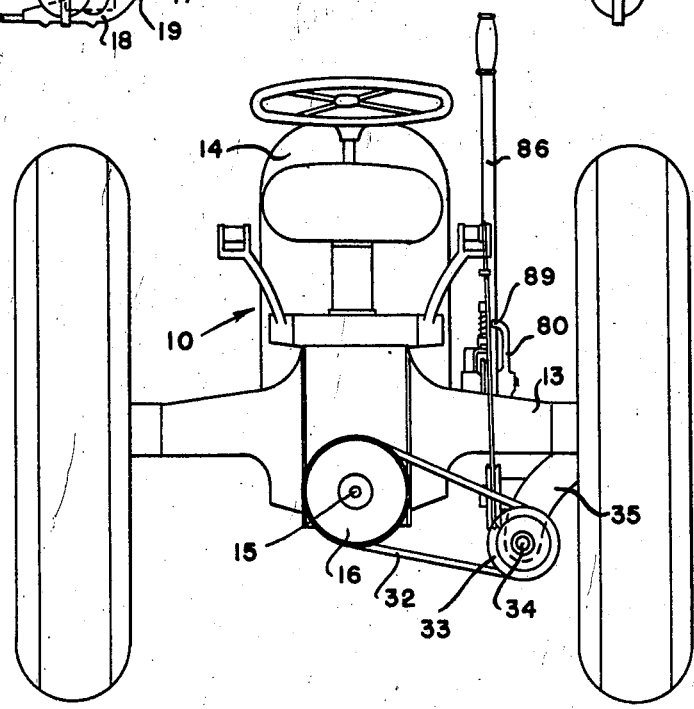
Figure 4 is a rear elevation of my improved tractor-mower.
Figure 8:
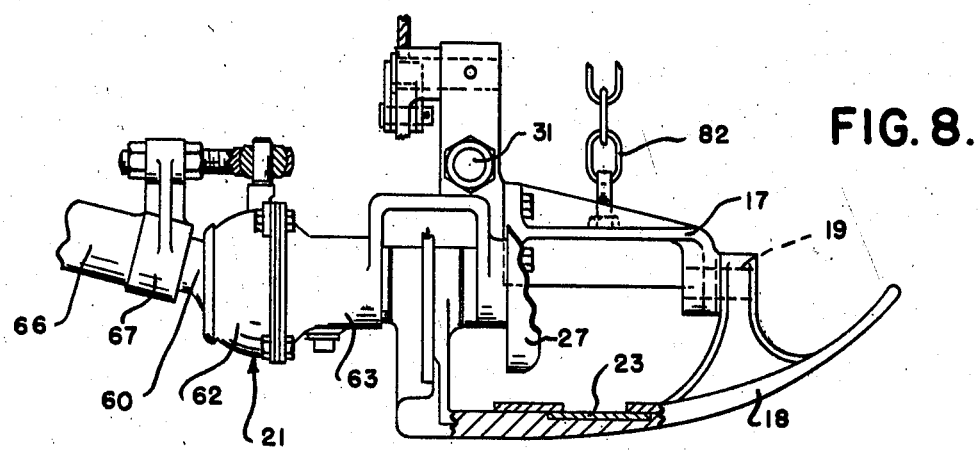
Figure 8 is an enlarged fragmentary view of a portion of Figure 1.
Figure 9:
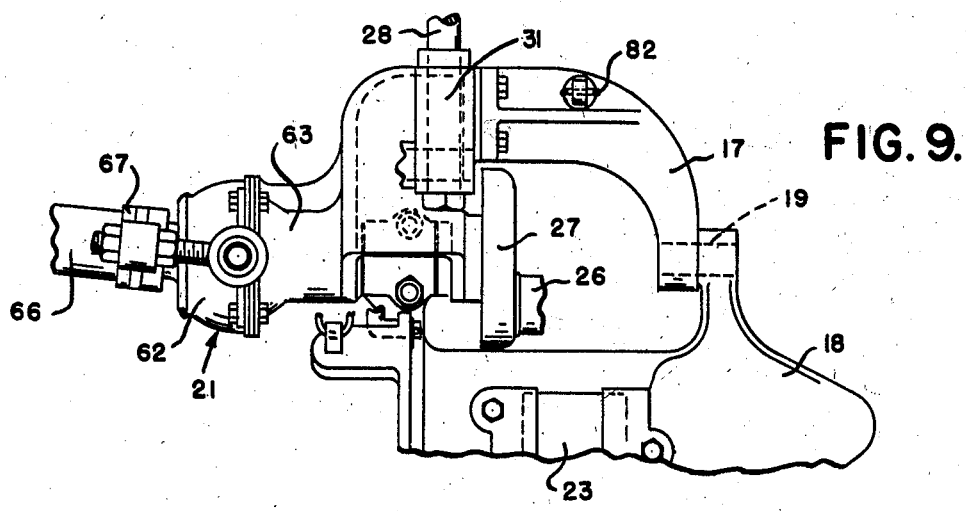
Figure 9 is an enlarged fragmentary view of a portion of Figure 2.
Figure 10:
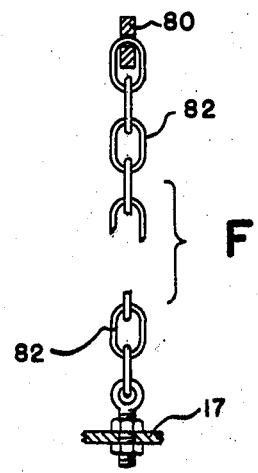
Figure 10 is a section taken substantially on the line 10—10 of Figure 1.

The bell crank 80 is adapted to apply continuously a lifting force to the support 17, but the force exerted by the spring 83 is less than sufficient to completely counterbalance the weight of the support 17 and its associated structure. Manual means is provided for further actuating the bell crank 80, and this takes the form of a lever 86 pivoted on the stub shaft 80ª and having locking means actuated by the release 87 associated with a toothed sector 88 constituting a laterally offset upward extension of the bracket 81. (See Figure 7). The bell crank 80, as best seen in Figures 4 and 6, has an offset portion 89 extending into the path of movement of the lever 86. As a result, movement of the lever 86 rearwardly, as seen in Figure 1, results in positive rotation of the bell crank 80 and positive lifting of the support 17. By this means it is possible to limit the downward position of the support 17. Since the offset portion 89 engages lever 86 at one side only, upward movement of the support 17, due to external causes such as riding over a high point on the ground, is permitted. This upward movement of the support 17 permits bell crank 80 to rotate under the influence of spring 83, thus causing offset portions 89 to move away from lever 86. As soon as the support 17 passes over the high point on the ground, it drops down to its initial position, determined by the setting of lever 86, where offset portion 89 again abuts lever 86.

Figure 3:
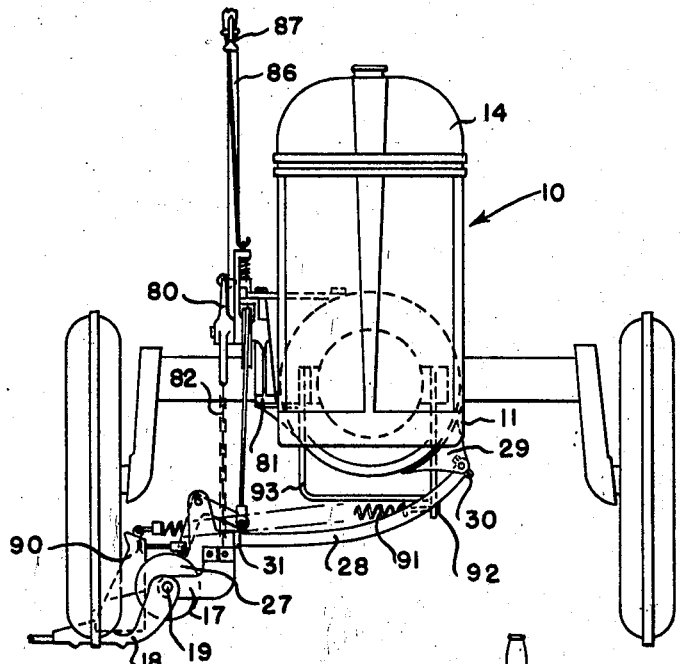
Figure 3 is a front elevation of my improved tractor-mower.

Referring now particularly to Figure 3, the shoe 18 is provided with a vertically upstanding arm 90, by means of which the shoe and the associated mower arm are adapted to be swung upwardly. Secured to the upper end of the arm 90 is a tension spring 91, the opposite end of which is secured as indicated at 92 to a bracket 93 secured to the frame of the tractor and to which in turn is secured the bracket 81 previously referred to. As best seen in Figure 1, the tension spring 91 exerts a clockwise moment on the shoe 18, and counterbalances a portion of the weight thereof. The spring 91 is selected so that it is insufficient to actually raise the mower arm, but it counterbalances a major portion of the weight thereof and permits the mowing arm to rest lightly on the ground. As a result, springs 91 and 83 together insure that the moving arm as a whole will rest lightly on the ground, with the spring 83 counterbalancing a large portion of the weight of the assembly at the inner end and exerting a direct lift thereon, and the spring 91 exerts a lifting moment which tends to swing the mowing arm vertically.

What I claim as my invention is:

1. In a mowing machine, an elongated upright bracket attachable at its lower end to a tractor and provided at its upper free end with a laterally projecting portion having on the upper side thereof an upstanding toothed sector, a stub shaft projecting laterally from the bracket intermediate its ends in spaced substantially parallel relation to the laterally projecting portion aforesaid, means including a spring-actuated lever on the stub shaft for constantly urging a mowing arm of the machine upwardly, said lever having an offset portions, means including a hand lever on the stub shaft adjacent the free end of the laterally projecting portion of the bracket engageable with the offset portion of the spring-actuated lever for lifting such mowing arm, and means including a latch carried by the hand lever and engageable with the toothed sector portion of the bracket to control swinging movement of the hand lever on the stub shaft, the offset portion of the spring-actuated lever being engageable with the hand lever to limit downward movement of the mowing arm.

2. In a mowing machine, an upright bracket attachable to a tractor and provided with a laterally projecting portion having on the upper side thereof an upstanding toothed sector, a stub shaft carried by the bracket in spaced substantially parallel relation to the laterally projecting portion aforesaid, means including a spring-actuated lever on the stub shaft for constantly urging a mowing arm of the machine upwardly, said lever having a lateral projection, means including a hand lever on the stub shaft adjacent the free end of the laterally projecting portion of the bracket engageable with the lateral projection of the spring-actuated lever for lifting such mowing arm, and means including a latch carried by the hand lever and engageable with the toothed sector portion of the bracket to control swinging movement of the hand lever on the stub shaft.

3. In a mowing machine, an upright bracket attachable to a tractor and provided with a laterally projecting portion having on the upper side thereof an upstanding toothed sector, means including a pivotally mounted spring-actuated lever adjacent the free end of the laterally projecting portion of the bracket for constantly urging a mowing arm of the machine upwardly, said lever having a lateral projection, means including a pivotally mounted hand lever between the lever aforesaid and the free end of the laterally projecting portion of the bracket engageable with the lateral projection of the spring-actuated lever for lifting the mowing arm, and means including a latch carried by the hand lever and engageable with the toothed sector portion of the bracket to control the swinging movement of said hand lever.

HOWARD W. SIMPSON.